US006637847B2

(12) United States Patent
Crisp et al.

(10) Patent No.: US 6,637,847 B2
(45) Date of Patent: Oct. 28, 2003

(54) BEZEL RELEASE LATCH

(75) Inventors: Richard Andrew Crisp, Rochester, MN (US); Scott Raymond LaPree, Rochester, MN (US); Bob Springer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/084,188

(22) Filed: Feb. 28, 2002

(65) Prior Publication Data
US 2003/0160460 A1 Aug. 28, 2003

(51) Int. Cl.[7] ............................................... A47B 81/00
(52) U.S. Cl. .............. 312/223.2; 292/83; 292/DIG. 37; 292/DIG. 11; 292/DIG. 63; 361/683
(58) Field of Search ................ 312/223.2, 265.6, 312/265.5, 215, 222; 361/683, 724–727; 292/80, 86, 127, 81, DIG. 37, 227, DIG. 11, DIG. 12, DIG. 63

(56) References Cited

U.S. PATENT DOCUMENTS

| 4,740,020 A | * | 4/1988 | Williams | 292/41 |
| 4,964,661 A | * | 10/1990 | Cadwell et al. | 292/87 |
| 5,465,191 A | * | 11/1995 | Nomura et al. | 361/681 |
| 5,484,175 A | * | 1/1996 | Teich et al. | 292/80 |
| 5,510,957 A | * | 4/1996 | Takagi | 361/814 |
| 5,577,779 A | * | 11/1996 | Dangel | 292/80 |
| 5,785,398 A | * | 7/1998 | Park | 312/223.2 |
| 5,823,644 A | * | 10/1998 | Suh et al. | 312/223.2 |
| 5,918,956 A | * | 7/1999 | Scholder | 312/223.2 |
| 5,997,115 A | * | 12/1999 | Radloff et al. | 312/222 |
| 6,076,869 A | * | 6/2000 | Chen et al. | 292/202 |
| 6,108,196 A | * | 8/2000 | Jung | 361/683 |
| 6,115,239 A | * | 9/2000 | Kim | 361/681 |
| 6,134,116 A | * | 10/2000 | Hoss et al. | 361/747 |
| 6,256,194 B1 | * | 7/2001 | Choi et al. | 361/683 |
| 6,273,532 B1 | * | 8/2001 | Chen et al. | 312/223.2 |
| 6,296,334 B1 | * | 10/2001 | Liao | 312/223.2 |
| 6,302,098 B1 | * | 10/2001 | Smith | 126/197 |
| 6,307,756 B1 | * | 10/2001 | Liu et al. | 361/816 |
| 6,354,680 B1 | * | 3/2002 | Lin et al. | 312/223.2 |
| 6,375,287 B1 | * | 4/2002 | Lai | 312/223.2 |

* cited by examiner

Primary Examiner—J. J. Swann
Assistant Examiner—Dinesh Melwani
(74) Attorney, Agent, or Firm—Rabin & Berdo, P.C.; Robert H. Berdo, Jr.

(57) ABSTRACT

A release latch includes a latch mechanism. The latch mechanism has a base, and an arm. The arm has one end attached to the base, and a free end. The latch mechanism further has a catch connected to the free end of the arm. The base is adapted to be attached to a first component, and the catch is adapted to releasably engage a second component to releasably hold the first component against the second component. The release latch further includes a release mechanism adapted to be attached to the first component, and being movable relative to the base. When the release mechanism is moved, the release mechanism engages the arm to move the arm, thereby causing the catch to disengage from the second component and allowing the first component to be moved away from the second component.

12 Claims, 10 Drawing Sheets

BEZEL RELEASE LATCH

BACKGROUND OF THE INVENTION

1. Field of the Invention

The present invention relates to a bezel release latch, and in particular, to a latch that will allow a bezel to be easily and repeatedly released from and connected to a frame without the use of tools.

2. Background Information

Frames or other enclosures are often used to house, for example, the various components of an electrical device, such as a computer. For example, circuit boards of the computer may be located within a metal frame to protect the circuit boards from being damaged, and to provide support for the circuit boards so that the circuit boards are properly positioned relative to each other.

In order to conceal the various inner workings of the computer, the frame may be provided with a cover, also referred to as a bezel, which may be formed from metal or plastic, for example. The installed bezel provides a barrier between the internal electrical components of the computer and the user. The bezel prevents the user from inadvertently coming in contact with a high-temperature or high-powered component located within the frame, thus protecting the user from accidental injury.

Further, the bezel helps protect the components located within the frame from environmental damage, such as dust or liquid contamination. For example, should a user inadvertently spill a glass of water on the computer, the bezel will provide a barrier that will help prevent the water from coming in contact with the internal components.

Additionally, the bezel provides a sound barrier that helps to muffle any noise generated by the components within the computer. For example, cooling blowers or fans are often used within the computer frame to cool the high-powered components located within the computer. These cooling blowers tend to generate a substantial amount of noise, which may be annoying to the user of the computer or to others working in the vicinity of the computer. The bezel helps to contain this noise.

Furthermore, the bezel can serve as an electromagnetic shield. As is known, the electrical components located within the frame, when operated, generate emissions that include electromagnetic radiation. When this electromagnetic radiation influences the proper functioning of another device, the result is known as electromagnetic interference (also known as EMI). In order to reduce the emitted electromagnetic radiation, the bezel can be formed of a conductive material so that, when grounded, the bezel will attenuate the electromagnetic radiation.

Furthermore, the bezel can be tailored to provide a decorative appearance to the computer. That is, the underlying frame is generally aesthetically displeasing, and utilitarian in appearance. For example, the frame may be provided with various air passages to allow for a cooling air to pass therethrough, so as to cool the electrical components located within the frame. These air passages are generally located without regard to the aesthetic appearance of the frame.

Further, the fame may be provided with one or more sub-enclosures, each of which houses specific components of the computer. These components are often interconnected, or connected to other components of the computer, using ribbon cables that may extend out from one sub-enclosure and to another sub-enclosure. This likewise may be aesthetically displeasing.

Utilizing a bezel will conceal the various inner workings of the computer, and will give the computer a finished look. Moreover, the bezel may be given a decorative appearance, using various design configurations, as are known in the art. As such, the computer (with bezel installed) can be used in home or office settings, with the bezel allowing the computer to blend in with the decor of the home or office. Further, the appearance of the bezel can be used to identify the manufacturer of the computer, using tradedress principles.

The bezel is typically removably fastened directly to the underlying frame. That is, it is often desirable to be able to remove the bezel from the frame, for example, to allow for the easy replacement of components located within the frame. Thus, it is known to fasten the bezel to the underlying frame using removable fasteners, for example screws or other threaded fasteners. However, installing threaded fasteners requires numerous turns of each threaded fastener to fully draw the removable bezel against the frame. Thus, installing and removing a threaded fastener is labor-intensive. Further, a threaded fastener may require the use of a special tool to fully secure the removable bezel to the frame. If an end user does not have access to the required tool, then the end user will be unable to remove and/or secure the bezel. Additionally, threaded fasteners are prone to cross-threading, causing damage to both the threaded fastener and the frame, thus potentially leaving the threaded fastener, bezel and frame, unusable. Thus, there is a need for a bezel release latch that does not require a threaded fastener, needs no tools for its engagement or disengagement, and which can be repeatedly engaged and disengaged both quickly and easily.

SUMMARY OF THE INVENTION

It is, therefore, a principal object of this invention to provide a bezel release latch.

It is another object of the invention to provide a bezel release latch that solves the above-mentioned problems.

These and other objects of the present invention are accomplished by the bezel release latch disclosed herein.

According to one aspect of the invention, the bezel release latch includes a latch mechanism. The latch mechanism includes a base that is tailored to be attached to an inside surface of a bezel. Moreover, the base may be provided with opposing guide arms, which will be more fully discussed in the paragraphs that follow.

The latch mechanism also includes an upwardly projecting arm, having one end fixed to the base. The one end of the arm may be integral with the base. This configuration facilitates the assembly of the bezel release latch, and ensures a strong bond between the base and the arm. However, it is also contemplated that the arm may be separately joined to the base.

The arm further has a free end having a catch thereon. The catch has a tapered surface extending from the tip of the arm to an apex of the catch.

In use, the latch mechanism is positioned on and fixed to the inside surface of the bezel. Moreover, the latch mechanism is preferably located so that when the bezel is properly positioned against the system frame, the arm will project through a hole, for example, provided in the system frame.

To latch the bezel to the system frame, the bezel is moved toward the system frame. This may be accomplished by pivoting the bezel relative to the system frame. As the bezel and bezel release latch are moved closer to the system frame, the catch will come into initial contact with the edge of the hole in the system frame. Because the catch has a tapered surface, further movement of the bezel and bezel release latch toward the system frame will cause the edge of the hole in the system frame to slide along the catch, while urging the arm outward, i.e., away from the edge of the hole. When the edge of the hole is on an apex of the catch, the arm will be positioned at its outermost position. At this position, the memory effect of the arm will cause the arm to exert a spring force that acts in a direction toward the edge of the hole. As such, after the edge of the hole passes the apex of the catch, for example when the bezel is disposed in position fully against the system frame, the arm will move back to its original position, with the catch now being disposed on a back surface of the system frame. Thus, the catch will firmly hold the bezel against the system frame. To increase the holding power of the latch mechanism, the catch may form a step at a transition between the apex of the catch and the arm.

To release the latch mechanism from the system frame, the bezel release latch may further include a release mechanism, which when activated, pushes the arm away from the edge of the hole to disengage the catch from the system frame. In this exemplary aspect of the invention, the release mechanism includes a button that has a front edge that projects through a hole or groove, for example, formed in an edge of the bezel, to allow the button to be accessed and activated by an end user. A back edge of the button is disposed adjacent to the arm of the latch mechanism.

The button is slidable within the hole or groove formed in the edge of the bezel. To release the latch mechanism, the button is pushed by a user, causing the button to be urged and slid toward and against the arm of the latch mechanism. Further pushing of the button causes the button to urge the arm of the latch mechanism outward. This causes the catch to move away from the edge of the hole, thereby disengaging the latch mechanism from the system frame. Once disengaged, the bezel may be moved away from the system frame. Moreover, when the user releases the button, the memory effect of the arm will urge the button back to its original position.

In a further aspect of the invention, the release mechanism may be provided with one or more guide features. For example, the back edge of the button can be provided with spaced-apart guide tabs. Each guide tab has a tapered edge that faces the tapered edge of the other guide tab. In use, the guide tabs are located on opposite sides of the arm of the latch mechanism. The guide tabs help to ensure that the button is centered relative to the arm. That is, should the button be disposed slightly off-center relative to the arm prior to the pushing of the button, the tapered edges of the guide tabs will engage with the arm, thereby self-centering the button relative to the arm.

The button may also be provided with wing guides on opposite sides thereof. The wing guides may be disposed within guide slots formed in the bezel, or as shown, be disposed under the respective guide arms of the base. The wing guides ensure that the button does not twist while being pushed, that is, rotate about an axis that is parallel to the surface of the bezel. The respective wing guide coming in contact with the respective guide arm would prevent any such twisting.

Moreover, the button may have a centrally located guide rib that extends from the rear edge of the button to the front edge of the button. The guide rib may terminate with a projecting guide finger, disposed at the front edge of the button. The projecting guide finger extends past the front edge of the button, and provides further insurance against twisting of the button.

In a further aspect of the invention, the bezel release latch includes a hold down and guide plate. The hold down and guide plate is disposed to hold the release mechanism against the inside surface of the bezel. That is, the release mechanism is disposed between the bezel and the hold down and guide plate. Thus, the hold down and guide plate retains the release mechanism against the bezel to prevent its loss.

The hold down and guide plate may be tailored to guide the release mechanism in a linear direction, i.e., toward and away from the arm of the latch mechanism. In this aspect of the invention, the hold down and guide plate further includes a plurality of spaced apart guide members. The spaced apart guide members are tailored to fit on opposite sides of the guide rib of the button, and help to ensure that the button only moves in a linear direction.

In a further aspect of the invention, the hold down and guide member includes two resilient spring arms, each of which engages an opposite side of the button. The resilient spring arms help to maintain the button in a neutral position, and will maintain the button against the arm of the latch mechanism using a slight force. This configuration will thus help prevent the button from rattling about, when in an inactivated position.

In an exemplary aspect of the invention, the bezel is provided with two bezel release latches, located on opposite sides of the bezel, and toward the upper edge thereof. This configuration provides adequate latching support to the bezel. Moreover, this configuration allows the bezel to be easily removed from the system frame, simply by simultaneously activating both buttons to release both arms. However, it is also contemplated that the bezel release latches can be used in different locations and/or in different numbers. For example, one bezel release latch may be provided at the center of the top edge of the bezel, either alone, or together with bezel release latches located on the sides of the bezel.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, in the application, and if used, the terms "upper", "lower", "front", "back", "over", "under", and similar such terms are not to be construed as limiting the invention to a particular orientation. Instead, these terms are used only on a relative basis.

Referring to FIGS. 1–4, an exemplary aspect of a bezel release latch 10 according to the present invention is shown. The bezel release latch 10 is preferably formed from a nonconductive, rigid material, such as a polycarbonate material. However, the bezel release latch 10 can be formed from any material that has sufficient rigidity and strength to secure a bezel in a desired position.

As shown, the bezel release latch 10 is used with a computer 12. In particular, the bezel release latch 10 holds a removable bezel 14 to an underlying system frame 16. In the exemplary embodiment, the system frame 16 contains various components (not shown) of the computer 12, which may be accessed through the removal of the bezel 14. Moreover, in the context of this application, a bezel is defined as a panel that forms at least a portion of an exterior cover of the computer, and which has both aesthetic and protective functions. However, it is contemplated that the bezel release latch according to the present invention may be used for other purposes, for example, to releasably hold any sort of panel or plate in a desired position.

Figure 5:
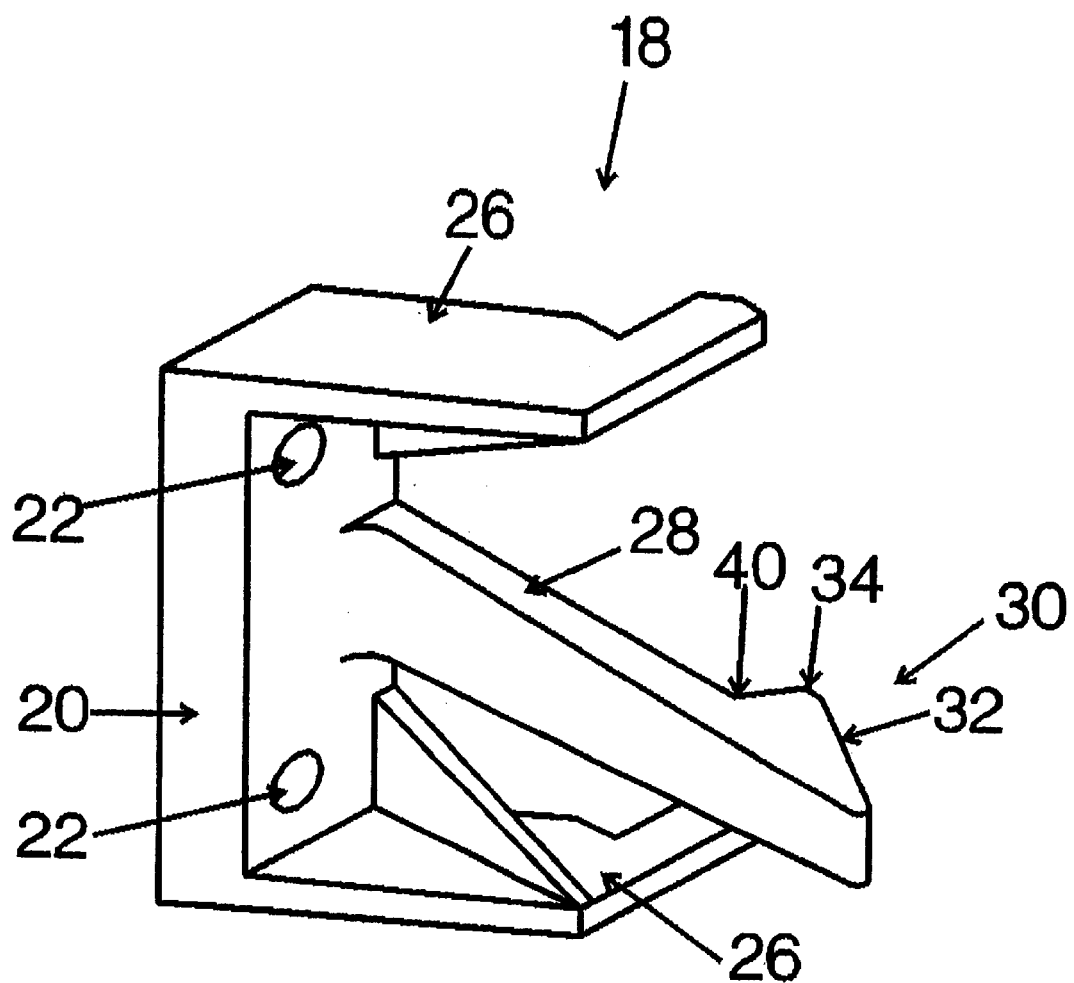
FIG. 5 is a perspective view of the latch mechanism of the bezel release latch shown in FIG. 1.
Figure 6:
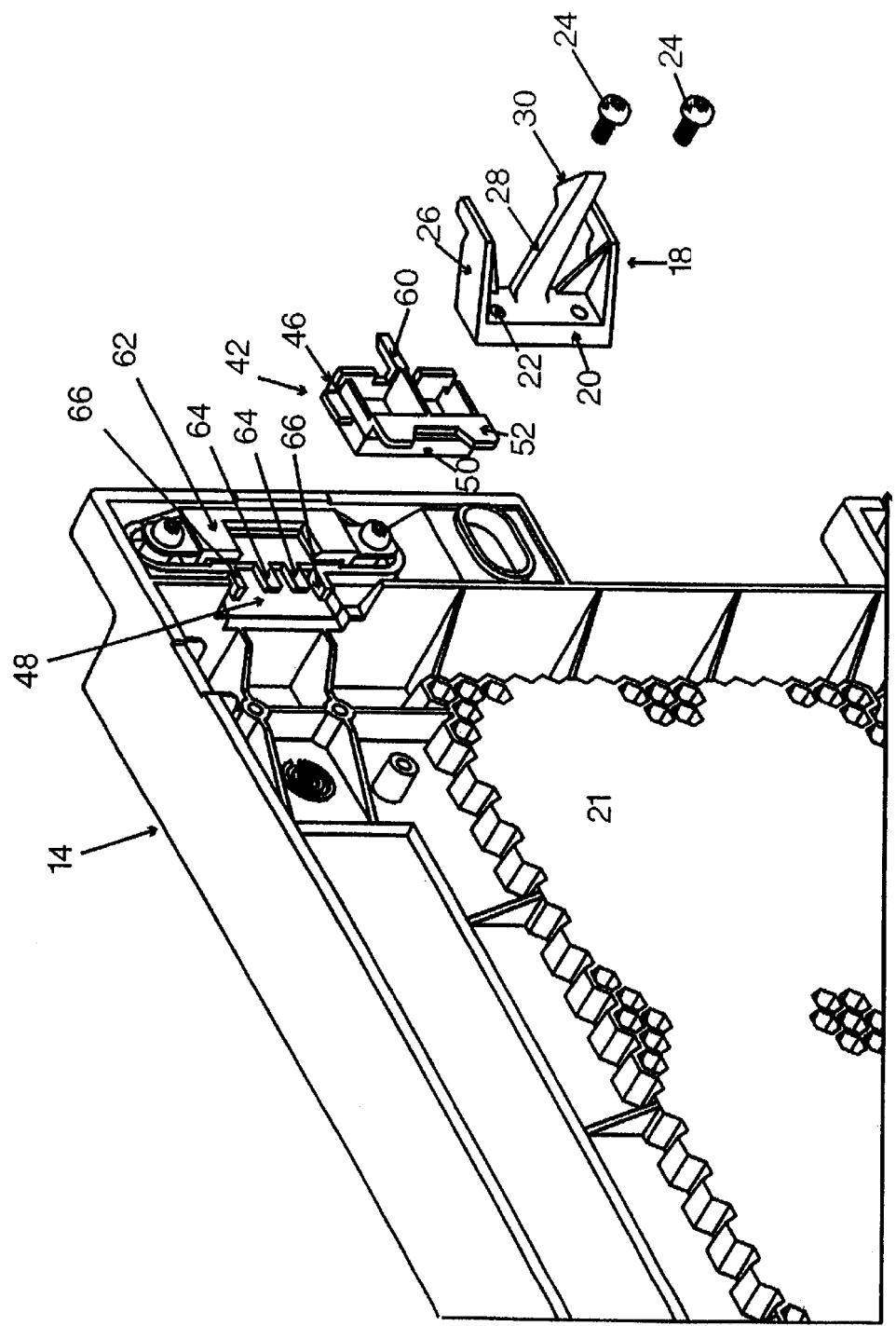
FIG. 6 is an exploded, perspective view of the bezel release latch shown in FIG. 1, together with an associated bezel.

As best shown in FIGS. 5 and 6, the bezel release latch 10 includes a latch mechanism 18. The latch mechanism 18 includes a base 20 that is tailored to be attached to an inside surface 21 of the bezel 14. For example, the base 20 may be provided with one or more through holes 22, which accommodate screws or other threaded fasteners. In the illustrated exemplary embodiment, the base 20 is provided with two through holes 22, with two screws 24 being used to fasten the base 20 to the bezel 14. Moreover, the latch mechanism 18 may be provided with opposing guide arms 26 connected to the base 20, which will be more fully discussed in the paragraphs that follow.

The latch mechanism 18 also includes an upwardly projecting arm 28, having one end fixed to the base 20. In the exemplary illustrated embodiment, the one end of the arm 28 is integral with the base 20. This configuration facilitates the assembly of the bezel release latch 10, and ensures a strong bond between the base 20 and the arm 28. However, it is also contemplated that the arm 28 may be separately joined to the base 20.

The arm 28 further has a free end having a catch 30 thereon. In the illustrated exemplary embodiment, the catch 30 is a tapered protuberance. That is, the catch 30 has a tapered surface 32 extending from the tip of the arm 28 to an apex 34 of the catch.

Figure 1:
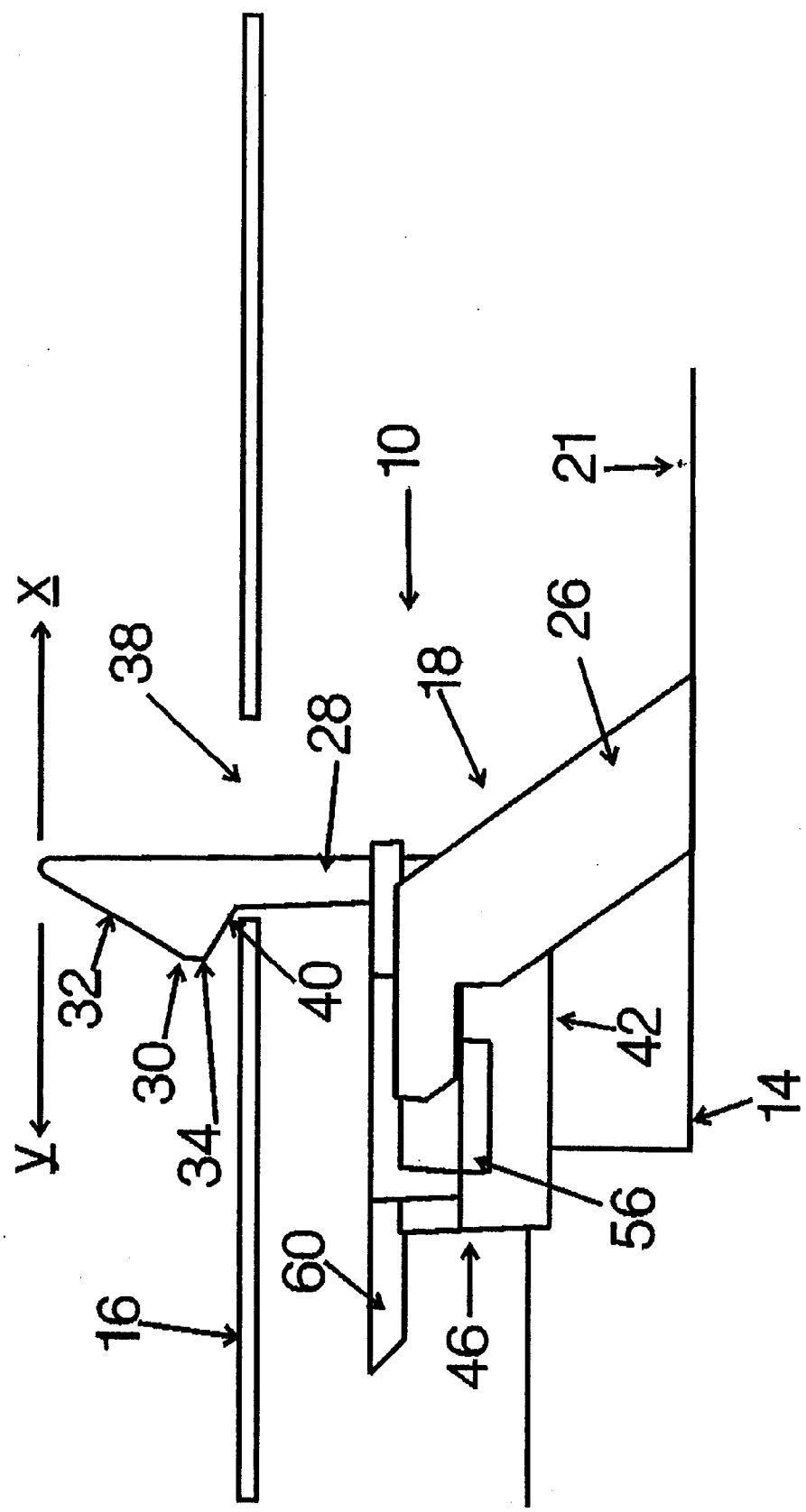
FIG. 1 is a side view of an exemplary aspect of a bezel release latch according to the present invention, being utilized with a schematically-shown bezel and an underlying frame.
Figure 2:
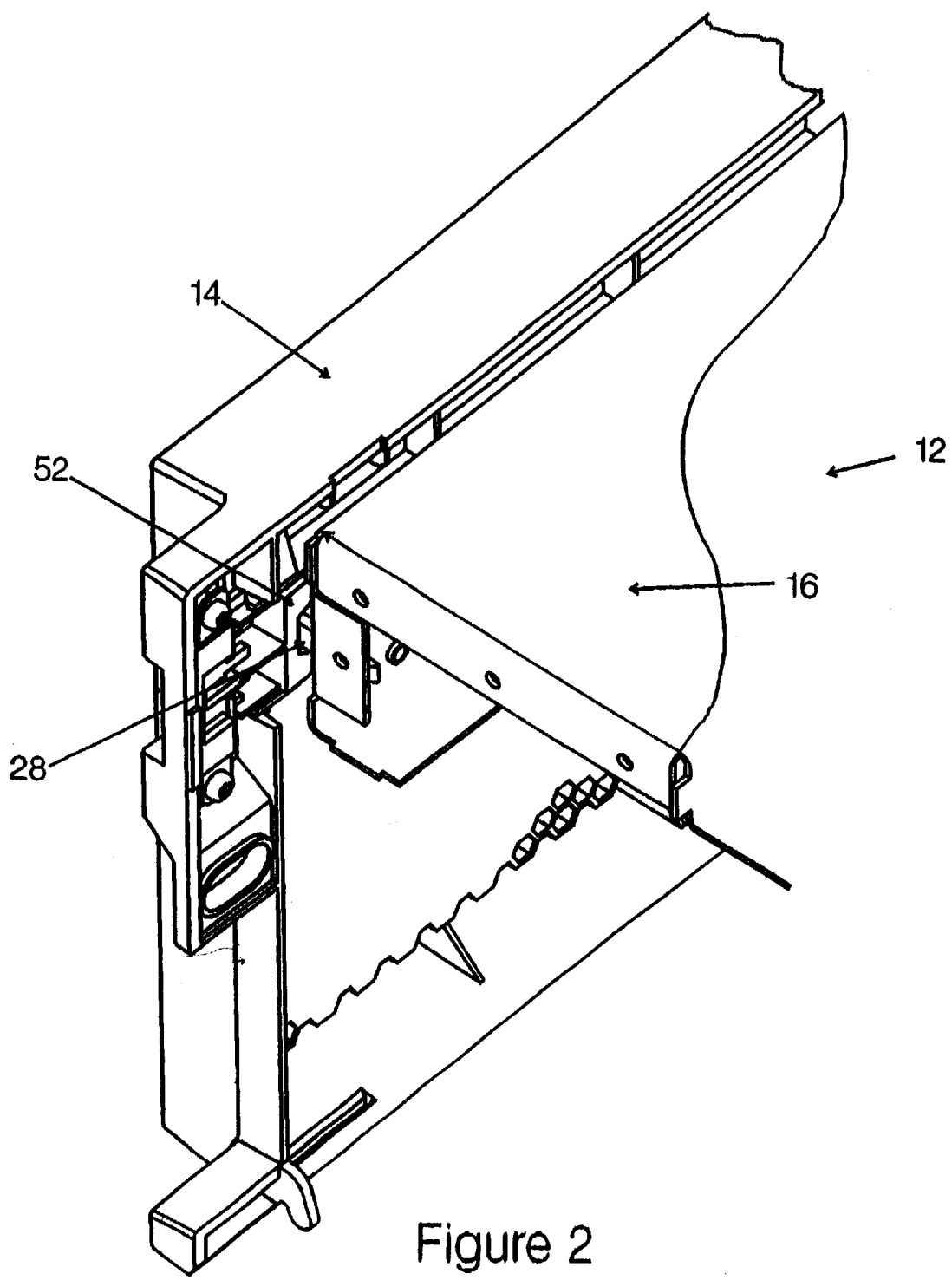
FIGS. 2–4 are various perspective views of the bezel release latch shown in FIG. 1, together with an associated bezel and system frame.
Figure 3:
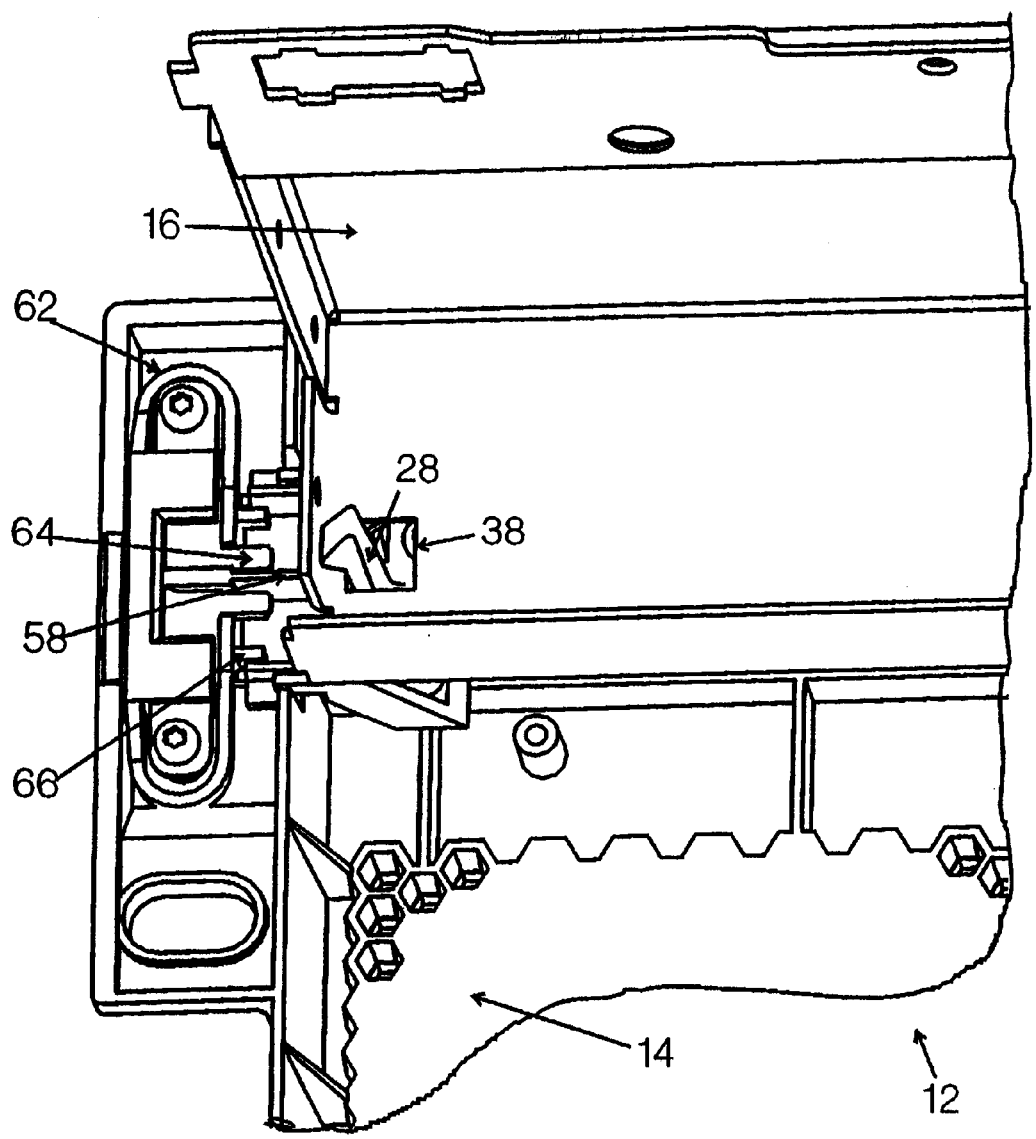
Figure 4:
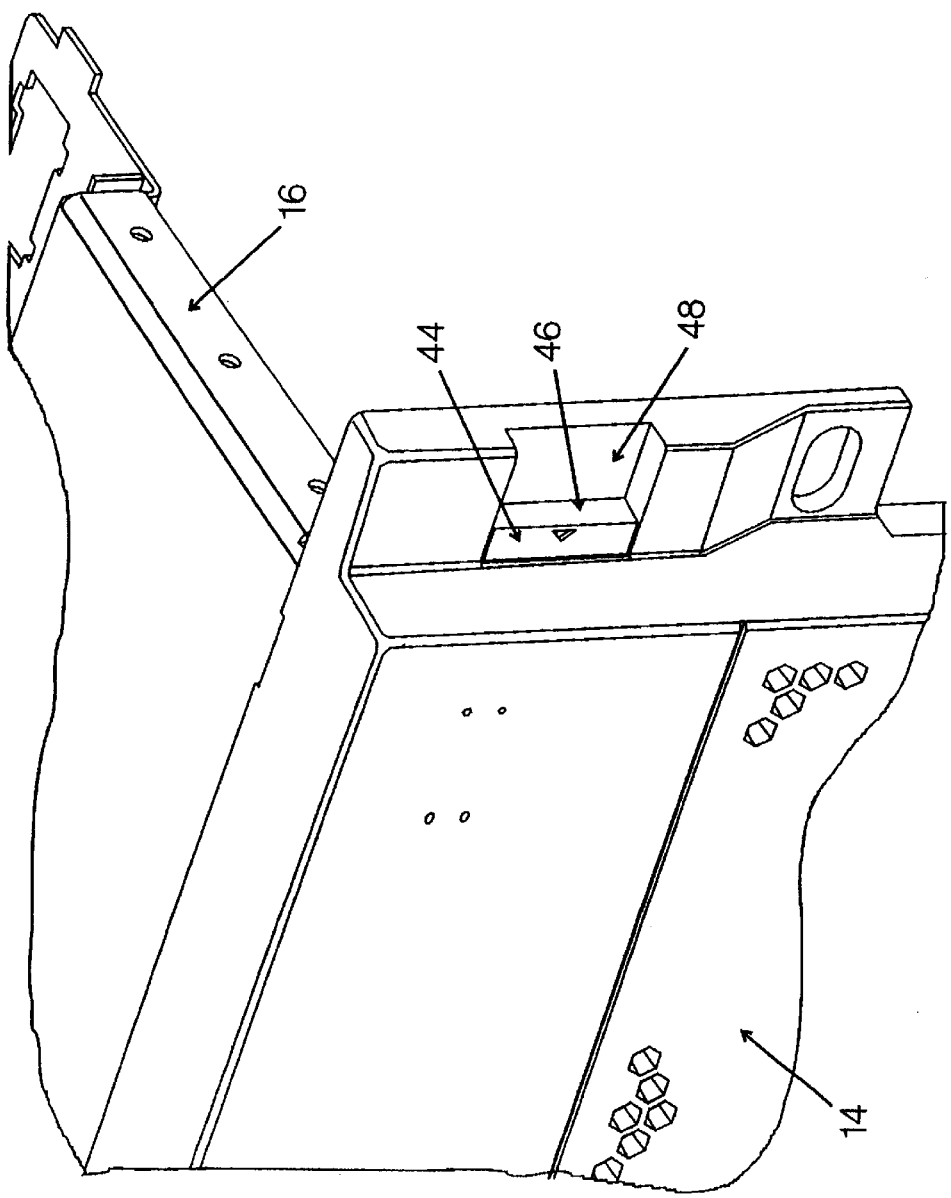

In use, the latch mechanism 18 is preferably located so that when the bezel 14 is properly positioned against the system frame 16, the arm 28 will project through a hole 38, for example, provided in the system frame (see FIG. 1 and 3).

To latch the bezel 14 to the system frame 16, the bezel is moved toward the system frame. This may be accomplished by pivoting the bezel 14 relative to the system frame 16. For example, the bezel 14 may be provided with lugs along its lower edge, which engage with the system frame 16, and about which the bezel may be pivoted. With such an arrangement, the bezel release latch 10 may be disposed toward an upper edge of the bezel 14.

As the bezel 14 and bezel release latch 10 are moved closer to the system frame 16, the catch 30 will come into initial contact with the edge of the hole 38 in the system frame. Because the catch 30 has a tapered surface 32, further movement of the bezel 14 and bezel release latch 10 toward the system frame 16 will cause the edge of the hole 38 in the system frame to slide along the catch, while urging the arm 28 outward in direction X, i.e., away from the edge of the hole. When the edge of the hole 38 is on an apex 34 of the catch 30, the arm 28 will be positioned at its outermost position. At this position, the memory effect of the arm 28 will cause the arm to exert a spring force that acts in a direction Y toward the edge of the hole 38. As such, after the edge of the hole 38 passes the apex 34 of the catch 30, for example when the bezel is disposed in position fully against the system frame 16, the arm 28 will move back to its original position, with the catch 30 now being disposed on a back surface of the system frame, as shown in FIGS. 1 and 3. Thus, the catch 30 will firmly hold the bezel 14 against the system frame 16. To increase the holding power of the latch mechanism 18, the catch 30 may form a step 40 at a transition between the apex 34 of the catch 30 and the arm 28. The step 40 holds the frame 16 against the catch 30, and prevents inadvertent separation.

Figure 7:
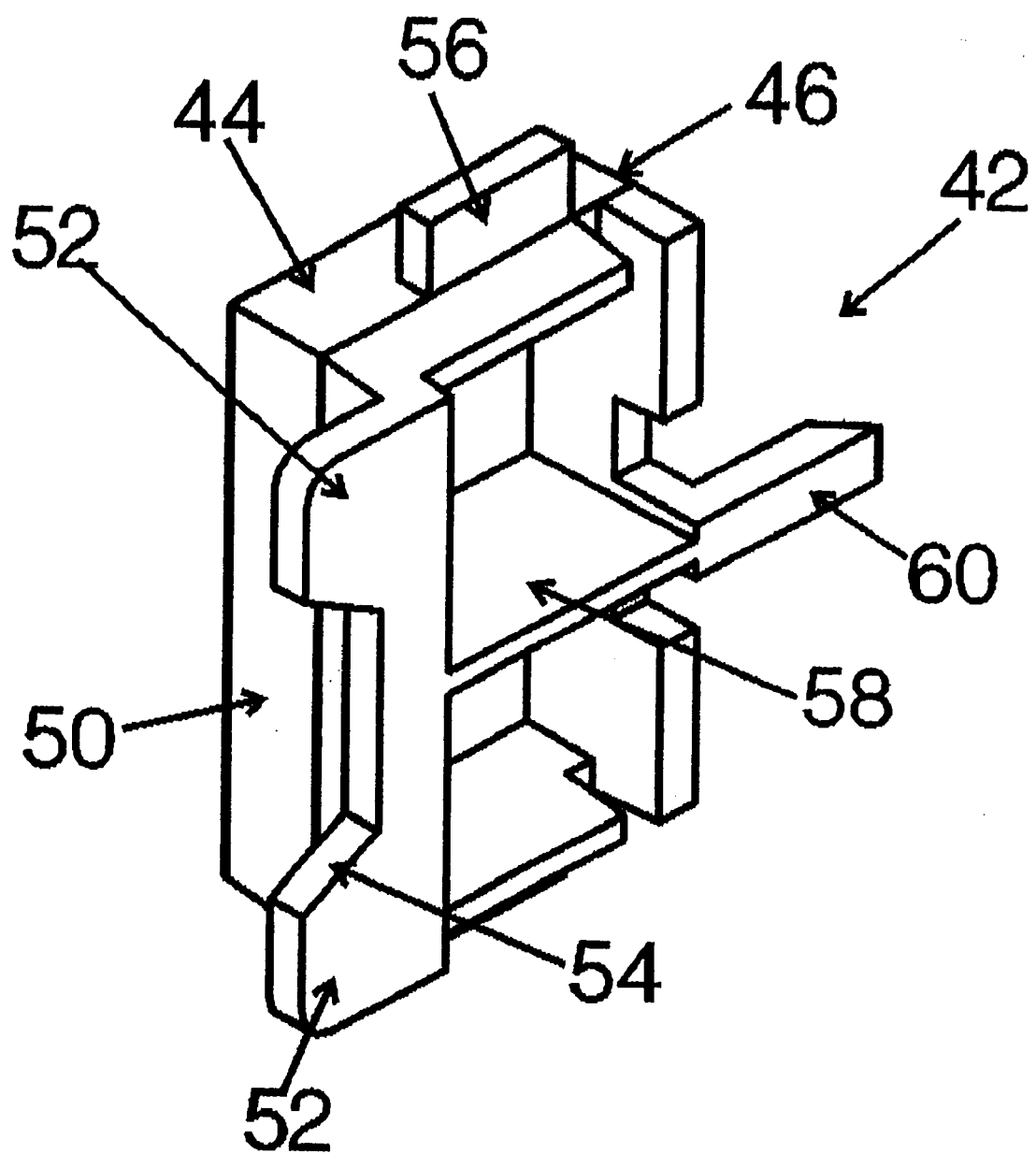
FIG. 7 is a perspective view of the release mechanism of the bezel release latch shown in FIG. 1.

Referring also to FIG. 7, to release the latch mechanism 18 from the system frame 16, the bezel release latch 10 further includes a release mechanism 42, which when activated, pushes the arm 28 away from the edge of the hole 38 to disengage the catch 30 from the system frame. The release mechanism 42 includes a button 44 that has a front edge 46 that projects through a hole or groove 48, for example, formed in an edge of the bezel (see also FIGS. 4 and 6), to allow the button 44 to be accessed and activated by an end user from an exterior side of the bezel. A back edge 50 of the button 44 is disposed adjacent to the arm 28 of the latch mechanism 18.

The button 44 is slidable within the hole and/or groove 48 formed in the edge of the bezel 14. To release the latch mechanism 18, the button 44 is pushed by a user, causing the button 44 to be urged and slid in direction X toward and against the arm 28 of the latch mechanism 18. Further pushing of the button 44 causes the button to urge the arm 28 of the latch mechanism 18 outward. This causes the catch 30 to move away from the edge of the hole 38, thereby disengaging the latch mechanism 18 from the system frame 16. Once disengaged, the bezel 14 may be moved away from the system frame 16. Moreover, when the user releases the button 44, the memory effect of the arm 28 will urge the button 44 back to its original position.

Figure 8:
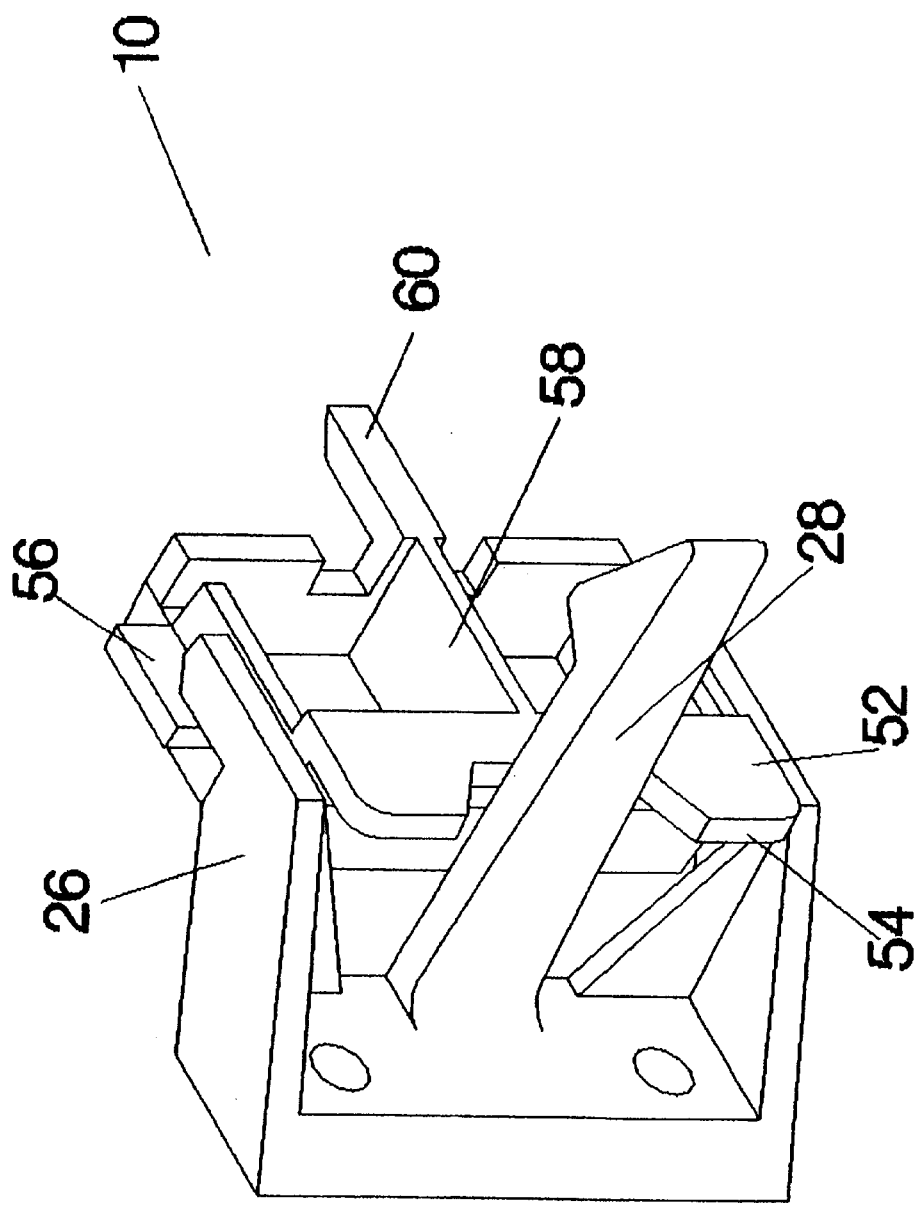
FIG. 8 is a perspective view of the bezel release latch shown in FIG. 1
Figure 9:
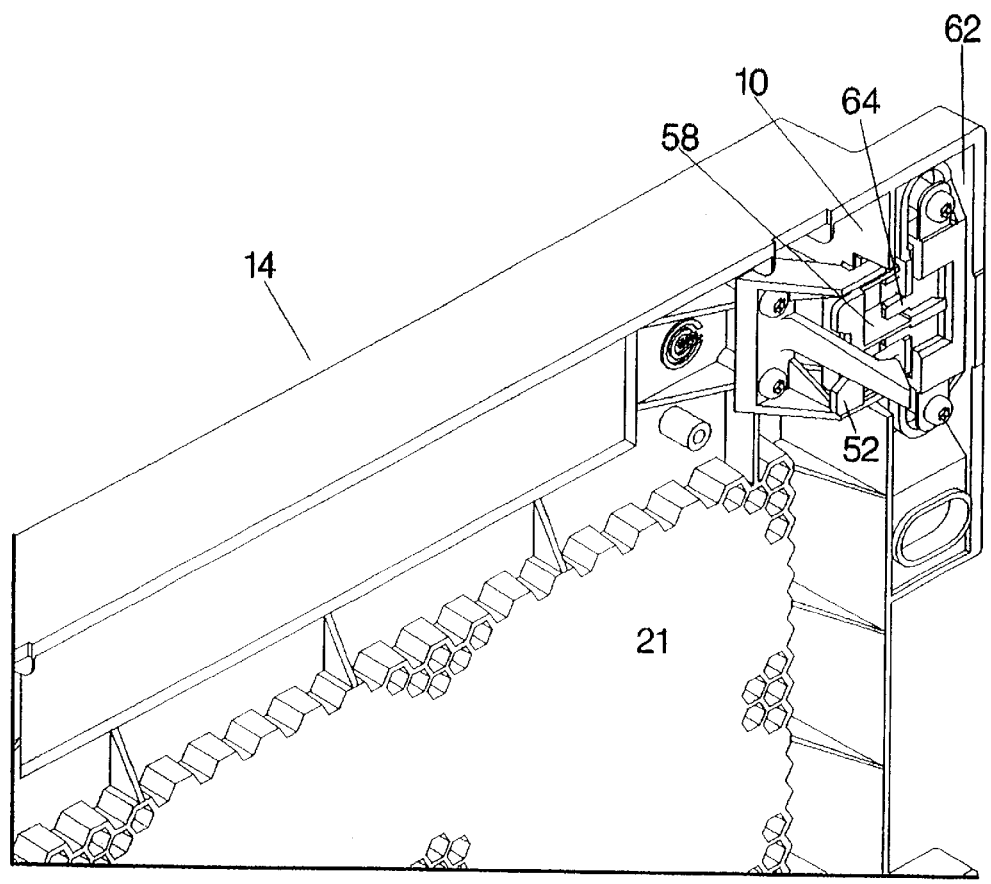
FIG. 9 is a perspective view of the bezel release latch shown in FIG. 1, together with an associated bezel.

Referring also to FIGS. 8 and 9, the release mechanism 42 may further be provided with one or more guide features. For example, the back edge 50 of the button 44 can be provided with spaced-apart guide tabs 52. Each guide tab 52 has a tapered edge 54 that faces the tapered edge of the other guide tab. In use, the guide tabs 52 are located on opposite sides of the arm 28 of the latch mechanism 18. The guide tabs 52 help to ensure that the button 44 is centrally positioned relative to the arm 28 when the button 44 is pushed. That is, should the button 44 be disposed slightly off-center relative to the arm 28 prior to the pushing of the button 44, the tapered edges 54 of the guide tabs 52 will engage with the arm, thereby self-centering the button 44 relative to the arm.

The button 44 may also be provided with wing guides 56 on opposite sides thereof. The wing guides 56 may be disposed within guide slots (not shown) formed in the bezel, or as shown, be disposed under the respective guide arms 26 of the base 20. The wing guides 56 ensure that the button 44 does not twist while being pushed, that is, rotate about an axis that is parallel to the surface of the bezel 14. The respective wing guide 56 coming in contact with the respective guide arm 26 would prevent any such twisting.

Moreover, the button 44 may have a centrally located guide rib 58 that extends from the back edge 50 of the button 44 to the front edge 46 of the button. The guide rib 58 may terminate with a projecting guide finger 60, disposed at the front edge 46 of the button 44. The projecting guide finger 60 extends past the front edge 46 of the button 44, and provides further insurance against twisting of the button.

In a further aspect of the invention, the bezel release latch 10 includes a hold down and guide plate 62. The hold down and guide plate 62 is disposed to hold the release mechanism 42 against the inside surface 21 of the bezel 14. That is, the release mechanism 42 is disposed between the bezel 14 and the hold down and guide plate 62. Thus, the hold down and guide plate 62 retains the release mechanism 42 against the bezel 14 to prevent its loss.

In the illustrated embodiment, the hold down and guide plate 62 is fastened to the bezel using threaded fasteners. However, it is also contemplated that the hold down and guide plate may be integrally formed with the bezel.

Moreover, the hold down and guide plate 62 may be tailored to guide the release mechanism 42 in a linear direction, i.e., toward and away from the arm 28 of the latch mechanism 18. In this aspect of the invention, the hold down and guide plate 62 further includes a plurality of spaced apart guide members 64. In the illustrated embodiment, the hold down and guide plate 62 has two such guide members 64. The spaced apart guide members 64 are tailored to fit on opposite sides of the guide rib 58 of the button 44, and help to ensure that the button only moves in a linear direction.

As best shown in FIGS. 3 and 6, in a further aspect of the invention, the hold down and guide plate 62 includes two resilient spring arms 66, each of which engages an opposite side of the button 44. The resilient spring arms 66 help to maintain the button 44 in a neutral position, and will maintain the button against the arm 28 of the latch mechanism 18 using a slight force. This configuration will thus help prevent the button 44 from rattling about, when in an inactivated position.

Figure 10:
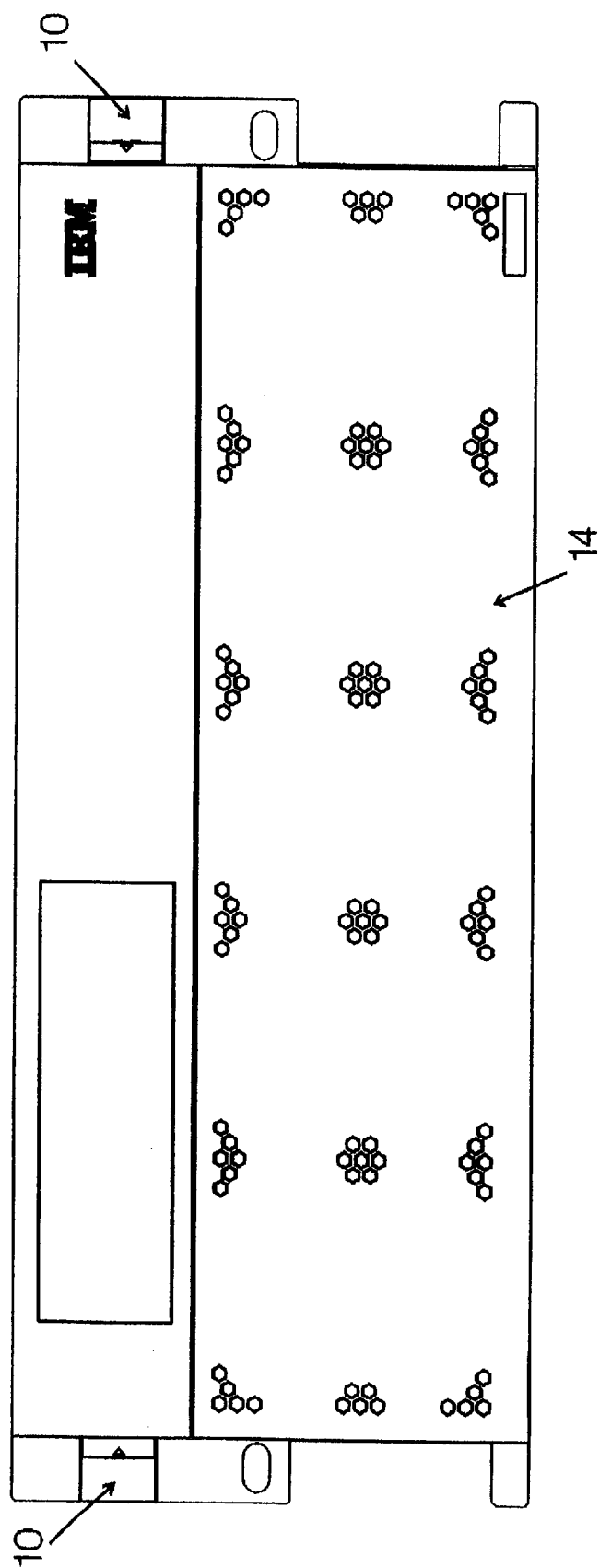
FIG. 10 illustrates a bezel, in conjunction with the bezel release latch shown in FIG. 1.

Referring also to FIG. 10, in an exemplary aspect of the invention, the bezel 14 is provided with two bezel release latches 10, located on opposite sides of the bezel, and toward the upper edge thereof. This configuration provides adequate latching support to the bezel. Moreover, this configuration allows the bezel 14 to be easily removed from the system frame 16, simply by simultaneously activating both buttons 44 to release both arms 28. However, it is also contemplated that the bezel release latches 10 can be used in different locations and/or in different numbers. For example, one bezel release latch 10 may be provided at the center of the top edge of the bezel, either alone, or together with bezel release latches located on the sides of the bezel.

Although the above exemplary embodiments have described the invention in use with a system frame and a removable bezel, the bezel release latch 10 can be utilized whenever one component needs to latched to another component.

It should thus be understood that the invention is not necessarily limited to the specific arrangement and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

What is claimed is:

1. A release latch, comprising: a latch mechanism, having:
   a base adapted to be immovably fixed to a first component,
   a resilient arm having one end fixed to said base, and a free end,
   a catch connected to the free end of said arm and being adapted to releasably engage a second component so that the first component is releasably held against the second component, wherein as said catch is moved into contact with the second component, such contact causes said arm to flex to thereby move said catch to a position in which the catch can engage and hold the second component; and
   a plurality of guide arms, each being connected to said base, and including a first guide arm disposed on one side of said arm, and a second guide arm disposed on another side of said arm; and
   a release mechanism adapted to be attached to the first component, and being activatable to move relative to said base, wherein when said release mechanism is activated, said release mechanism is moved from a first position, to a second position in which said release mechanism engages said arm to flex said arm, thereby causing said catch to disengage from the second component and allowing the first component to be moved away from the second component, and when said release mechanism is not activated and after said catch has disengaged from the second component, a memory effect of said arm causes said arm to return to a non-flexed position, thereby pushing said release mechanism back to the first position, said release mechanism including a first wing guide and a second wing guide positionable under said first guide arm and said second guide arm, respectively, wherein when said release mechanism is moved relative to said base, said first and second wing guides and said first and second guide arms cooperatively prevent said release mechanism from twisting.

2. The release latch defined in claim 1, wherein said catch has a tapered surface that terminates at an apex.

3. The release latch defined in claim 2, wherein said catch further has a step transition between the apex and said arm.

4. The release latch defined in claim 1, wherein said release mechanism includes a button, said first wing guide and a said second wing guide being disposed on opposite sides of said button.

5. The release latch defined in claim 1, wherein said release mechanism includes a button, and wherein a rear edge of said button engages said arm to move said arm when said release mechanism is moved relative to said base.

6. A release latch comprising:
   a latch mechanism, having:
      a base adapted to be immovably fixed to a first component,
      a resilient arm having one end fixed to said base, and a free end, and
      a catch connected to the free end of said arm and being adapted to releasably engage a second component so that the first component is releasably held against the second component, wherein as said catch is moved into contact with the second component, such contact causes said arm to flex to thereby move said catch to a position in which the catch can engage and hold the second component; and a release mechanism adapted to be attached to the first component, and being activatable to move relative to said base, wherein when said release mechanism is activated, said release mechanism is moved from a first position, to a second position in which said release mechanism engages said arm to flex said arm, thereby causing said catch to disengage from the second component and allowing the first component to be moved away from the second component, and when said release mechanism is not activated and after said catch has disengaged from the second component, a memory effect of said arm causes said arm to return to a non-flexed position, thereby pushing said release mechanism back to the first position, said release mechanism having a button, and wherein a rear edge of said button engages said arm to move said arm when said release mechanism is moved relative to said base, and wherein said release mechanism further includes two guide tabs disposed on the rear edge of said button, said guide tabs being separated from each other by a space, each said guide tab having a tapered edge that faces toward the space, wherein if said button is disposed off-center relative to said arm, when said release mechanism is moved relative to said base, said tapered edges will engage said arm to guide said button so that said arm is disposed in the space, thereby self-centering said button relative to said arm.

7. A release latch comprising:

a latch mechanism, having:
   a base adapted to be immovably fixed to a first component,
   a resilient arm having one end fixed to said base, and a free end, and
   a catch connected to the free end of said arm and being adapted to releasably engage a second component so that the first component is releasably held against the second component, wherein as said catch is moved into contact with the second component, such contact causes said arm to flex to thereby move said catch to a position in which the catch can engage and hold the second component; and a release mechanism adapted to be attached to the first component, and being activatable to move relative to said base, wherein when said release mechanism is activated, said release mechanism is moved from a first position, to a second position in which said release mechanism engages said arm to flex said arm, thereby causing said catch to disengage from the second component and allowing the first component to be moved away from the second component, and when said release mechanism is not activated and after said catch has disengaged from the second component, a memory effect of said arm causes said arm to return to a non-flexed position, thereby pushing said release mechanism back to the first position, said release mechanism having a button, and wherein a rear edge of said button engages said arm to move said arm when said release mechanism is moved relative to said base, and wherein said release mechanism has a guide rib extending from the rear edge of said button to a front edge of said button.

8. The release latch defined in claim 7, wherein said release mechanism includes a guide finger that projects beyond the front edge of said button, said guide rib terminating at said guide finger.

9. The release latch defined in claim 8, wherein guide finger and said guide rib are centrally located on said button.

10. A release latch comprising:

a latch mechanism, having:
   a base adapted to be immovably fixed to a first component,
   a resilient arm having one end fixed to said base, and a free end, and
   a catch connected to the free end of said arm and being adapted to releasably engage a second component so that the first component is releasably held against the second component, wherein as said catch is moved into contact with the second component, such contact causes said arm to flex to thereby move said catch to a position in which the catch can engage and hold the second component;

a release mechanism adapted to be attached to the first component, and being activatable to move relative to said base, wherein when said release mechanism is activated, said release mechanism is moved from a first position, to a second position in which said release mechanism engages said arm to flex said arm, thereby causing said catch to disengage from the second component and allowing the first component to be moved away from the second component, and when said release mechanism is not activated and after said catch has disengaged from the second component, a memory effect of said arm causes said arm to return to a non-flexed position, thereby pushing said release mechanism back to the first position; and further comprising a hold down and guide plate attachable to the first component to hold said release mechanism against the first component.

11. The release latch defined in claim 10, wherein said hold down and guide plate includes two spaced-apart guide members, and said release mechanism includes a button and a guide rib extending from a rear edge of said button to a front edge of said button, said guide rib being disposed between said spaced-apart guide members, said guide rib and said guide members cooperating to guide said button in a linear direction.

12. The release latch defined in claim 10, wherein said hold down and guide plate further includes at least one resilient spring arm engaged with said release mechanism.

* * * * *